Dec. 30, 1930.  G. M. PELTON  1,786,776
SETWORKS
Filed July 2, 1928  6 Sheets-Sheet 1

Fig.1

INVENTOR.
George M. Pelton
BY
ATTORNEY.

Dec. 30, 1930. G. M. PELTON 1,786,776
SETWORKS
Filed July 2, 1928 6 Sheets-Sheet 2

Dec. 30, 1930.  G. M. PELTON  1,786,776
SETWORKS
Filed July 2, 1928   6 Sheets-Sheet 4

INVENTOR.
George M. Pelton
BY
ATTORNEY.

Dec. 30, 1930.                G. M. PELTON                1,786,776
                                SETWORKS
                          Filed July 2, 1928        6 Sheets-Sheet 5

INVENTOR.
George M. Pelton
BY
ATTORNEY.

Dec. 30, 1930.  G. M. PELTON  1,786,776
SETWORKS
Filed July 2, 1928   6 Sheets-Sheet 6

INVENTOR.
George M. Pelton
BY
ATTORNEY.

Patented Dec. 30, 1930

1,786,776

UNITED STATES PATENT OFFICE

GEORGE M. PELTON, OF MILWAUKEE, WISCONSIN, ASSIGNOR TO THE FILER & STOWELL COMPANY, OF MILWAUKEE, WISCONSIN, A CORPORATION OF WISCONSIN

SETWORKS

Application filed July 2, 1928. Serial No. 289,881.

This invention relates in general to sawmills and more particularly to a power setworks for controlling the positioning of the knees transversely of the sawmill carriage.

One of the principal objects of the invention resides in the provision of a setworks of this character adapted for use with a rope, belt, or electric drive and which is of compact and balanced construction so as to require but comparatively little space on the sawmill carriage and a minimum of structural work for its support and yet is operable to positively and smoothly advance or recede the knees from the power drive.

Another important object of the invention resides in the provision of a setworks of this character which is easily controllable and which is operable to advance or set the knees accurately through any selected distance over a wide range.

Another object of the invention is to provide a setworks having organized therewith means under the full and direct view of the operator or setter which plainly indicates at all times the distance of the knee-face from the sawline and the distance which the knees are advanced during each setting movement, the latter indication serving to facilitate the sawing or cutting of boards of different thicknesses.

A still further object resides in the organization of a novel form of gearing or drive between the vertical shaft of the setting head and the indicating means organized with the setting head and with the adjustable elements thereof.

Another object is to cushion the impact of the clash blocks or stops of the setting head without interfering with accurate setting.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 3 is a view in central vertical longitudinal section through the setting head and the planetary gearing employed for advancing and receding the set shaft, parts being shown in elevation for the sake of illustration;

Referring to the drawings, the numeral 1 designates a conventional set shaft which may be rotatably mounted on the sawmill carriage in the usual manner and geared to the knees in accordance with the usual practice. As is well known, the set shaft of the sawmill carriage is operably connected to the knees by means of pinions fixed on the set shaft and meshing with racks adjustably or otherwise appropriately connected to the knees. All of this construction is well known and needs no detailed illustration here.

The present invention proposes generally the provision of a pair of power driven planetary gear sets organized with the set shaft for selectively rotating the same in either direction whereby the set shaft may be advanced for setting or reversed for receding through the planetary gear sets.

In carrying out this purpose, a bed plate or frame 2 is provided and is securely bolted down on the timbers of the carriage. The set shaft extends longitudinally of the bed plate and is rotatably fitted in bearings 3 and 4 provided therefor on the bed plate. Intermediate its ends the bed plate has a sectional driving gear housing 5 suitably secured thereto, and within this housing the driving gears for the planetary gear sets operate. As shown, these driving gears include a driving pinion 6 fixed on a drive shaft 7. The drive shaft 7 may be actuated from a rope, belt, or electric drive. For the sake of example the electric drive is illustrated and is shown as comprising an electric motor 8 having a pinion 9 fixed to its armature shaft and meshing with a gear wheel 10 having a yieldable driving connection with the shaft 7.

This yieldable driving connection may take the form of a slip clutch having the usual friction faced plates 11 keyed to the shaft 7 on the opposite sides of the gear 10 and engageable with the opposite faces of the gear. One plate is fixed against all movement relative to the shaft and the other may slide thereon though constrained to rotate therewith. A nut 12 is threaded on the shaft and is adjusted to force the sliding plate against the gear 10 whereby the gear is confined between and frictionally engaged and held by the plates. For locking the nut in adjusted position a spring pressed pawl 12ª is pivoted to the adjacent plate 11 and engages a ratchet 12ᵇ formed on the periphery of the nut. Obviously, any suitable friction or slip clutch may be employed.

The driving pinion 6 meshes with a beveled gear wheel 13 having a hub extension 14 loosely mounted on the set shaft 1, a bushing 15 being interposed between the hub extension 14 and the set shaft 1. The driven gear 13 also has a hub extension 16 extending oppositely with respect to the hub extension 14. On the ends of these hub extensions 14 and 16, gears 17 and 18 are cut and constitute the sun gears of the planetary gear sets. Two planetary gear sets are provided, one being designated generally at P and the other at P′.

The gear set P is utilized for imparting setting movement to the set shaft and consequently to the knees geared thereto and includes the sun gear 17, the planet pinions 19, and an internal orbit gear 20, the planet pinions 19 meshing with the sun gear 17 and with the internal orbit gear 20. The planet pinions 19 are rotatably mounted on studs 21 threadedly connected with a planet pinion carrier 22 and secured in position by lock screws 23 and lock nuts 24. The planet pinion carrier 22 has a hub 25 fitted on the set shaft 1 and keyed thereto as at 26. The internal orbit gear 20 is provided on the peripheral flange of a web 27, the web 27 having a sleeve-like hub 28 rotatably mounted on the hub extension 14 of a main driving gear inwardly of the sun gear 17 and consequently freely rotatable about the axis of the set shaft. This internal orbit gear is also fastened by machine screws 29 to a brake drum 30 which has a body plate or web 31 formed with a hub 32 rotatably mounted on the hub of the planet pinion carrier and consequently also freely rotatable about the axis of the set shaft. Bushings 33 and 34 are interposed between the hubs 28 and the hub extension 14 and the hub 27 and the hub 25, respectively. A brake band 35 is cooperatively arranged around the drum 30 and when tightened holds the drum 30 against movement.

With the drum 30 held against movement and the sun gear 17 driven, the planet pinions 19 are constrained to roll around the internal orbit gear 20 thereby rotating the planet pinion carrier 22 and consequently the set shaft 1. When the brake band 35 is loosened the rotation of the sun gear turns the planet pinions and causes the internal orbit gear 20 and its drum 30 to revolve freely or idle.

The planetary gear set P′, which is utilized for imparting receding movement to the set shaft and knees, includes the sun gear 18, and planet pinions 36 meshing with the sun gear 18 and with an internal orbit gear 37. The internal orbit gear 37 is fastened, as by machine screws 38, to a plate or disk 39 having an elongated hub 40 keyed to the set shaft 1 and over a bushed portion of which the hub extension 16 of the driven gear 13 loosely fits. The planet pinions 36 are rotatably mounted on stud shafts 41 threadedly connected with a planet pinion carrier 42 and locked thereto by lock screws 43 and lock nuts 43′. The planet pinion carrier 42 has a hub 42′ loosely mounted on the extension 16 in the main driving gear, a bushing 42ª being interposed between the hub 42′ and the extension 16. This planet pinion carrier 42 is fastened, as by machine screws 44, to a brake drum 45 integral with a body plate or web 46 formed with a hub 47 rotatably fitted over a portion of the hub 40, a bushing 53 being interposed between the hubs 47 and 40. Wherever desirable, spacing washers 54 may be employed. A brake band 55 coacts with the brake drum 45 and when tightened holds it against rotation.

With the brake drum 55 held against rotation the planet pinion carrier is held fixed and so when the sun gear 18 is driven it rotates the planet pinions about their stationary axes and the planet pinions when so rotated drive the internal gear 37 and consequently the set shaft fixed thereto. With this organization the direction of movement of the sun gear is transmitted reversed of the set shaft so that the set shaft operates to recede or retract the knees.

A single control lever 60 is provided for the two planetary gear sets P and P'. This lever 60 is fixed by means of a set screw 61 to a control shaft 62 paralleling the set shaft and rotatably mounted in bearings 63 and 64. On the control shaft 62 oppositely acting brake operating means are provided for the brake bands 35 and 55. These brake operating means are of indentical construction but are reversed so that when the lever is shifted in one direction the brake band 35 will be tightened and the brake band 55 loosened, and when shifted in the other direction the brake band 55 will be tightened and the brake band 35 loosened.

Figures 4, 5, 7:
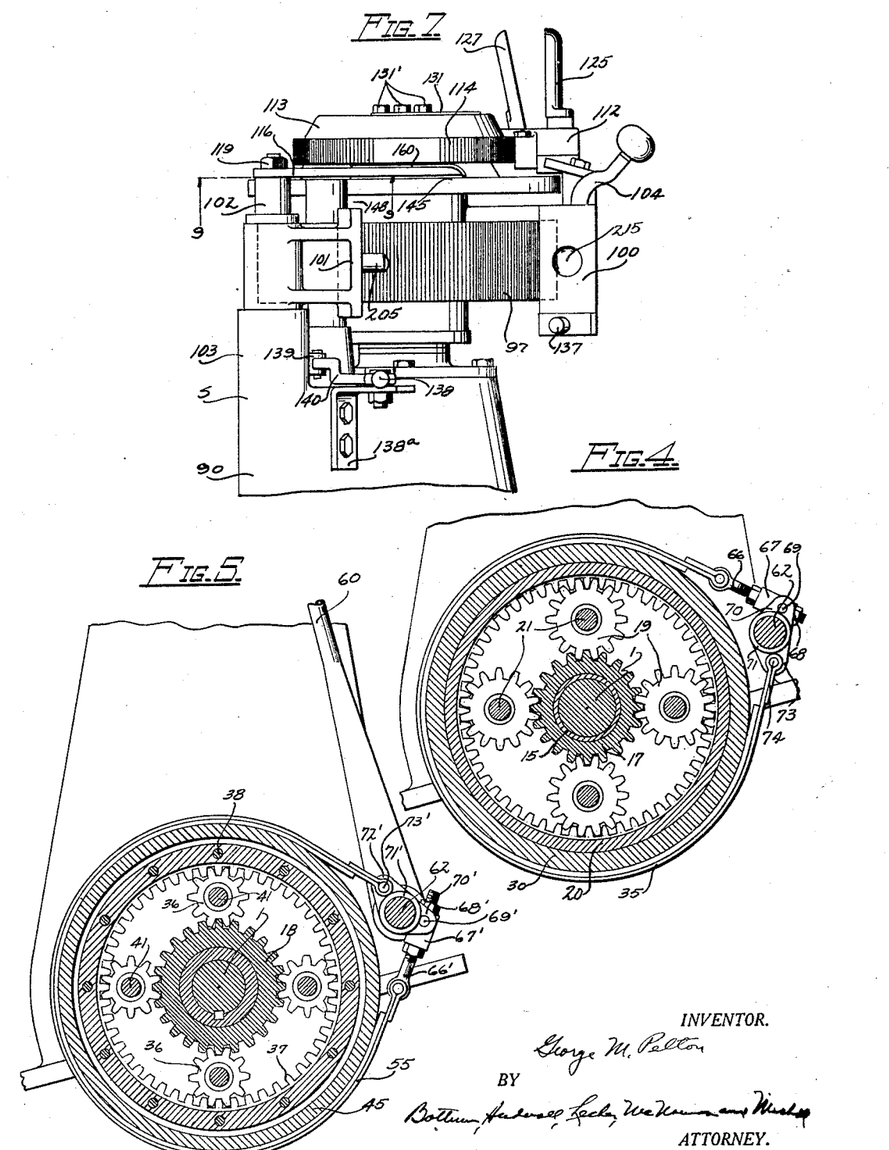
Figures 4 and 5, are views in transverse vertical section taken on line 4—4 and 5—5, respectively, of Figure 3.
Figure 7 is a fragmentary view thereof in side elevation.
Figures 5, 8:
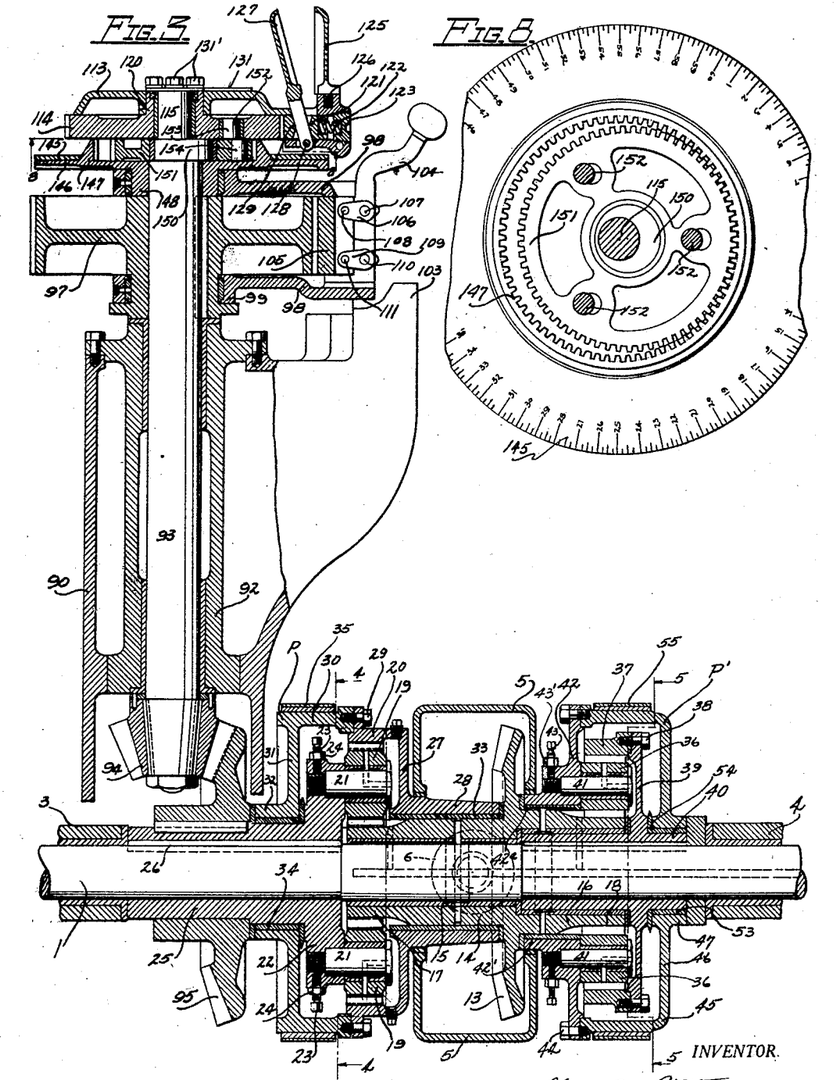
Figure 8 is a view in horizontal section taken on line 8—8 of Figure 3.

Thus, as shown in Figure 4, the upper end of the brake band 35 is pivotally connected to an eye bolt 66 threaded through a block 67 and held in adjusted position relative to the block 67 by lock nuts 68. The block 67 is pivotally mounted in upwardly and outwardly extending lugs or crank arms 70 integral with a collar 71 fixed to the control shaft 62, pivot pins 69 being secured to the crank arms 70 by cross pins 69' and projecting into recesses formed in the sides of the block 67 to effect this pivotal mounting. The collar 71 also has a downwardly extending crank arm 73 having a similar pivotal connection indicated at 74 to the other or lower end of the brake band. The crank arms 70 and 73 are so arranged that when the control shaft 62 is rotated in a clockwise direction, as viewed in Figure 4, the upper end of the band will be pulled laterally and downwardly and consequently tensioned. The lower end of the band is maintained in substantially the same relation to the drum so far as the tension of the band 35 is concerned for its pin 74 is located at the lowermost point of its arc of movement when the band 35 is released.

It is true that this pin 74 moves in an arcuate path but in view of its position the arcuate movement has only a very slight upward component and is largely in a direction laterally toward the drum whereby the lowermost end of the band is maintained substantially in fixed position although pulled upwardly and tightened slightly. However, the upper end of the band is subjected to considerable tension and consequently the band is tightened around the drum to hold the same in position.

The mechanism for operating the brake band 55 is shown in Figure 5 and as previously indicated is of the same construction as that for operating the brake band 35 although its parts are reversed. Thus, in Figure 5, we have an eye bolt 66' pivotally connected to the lower end of the band 55 and adjustably connected to a block 67' by means of nuts 68'. The block 67' is swiveled as at 69' to crank arms 70' integral with a collar 71' fixed on the shaft 62 and extending downwardly and outwardly away from the drum. The collar 71' has its crank arms 72' extending upwardly and inwardly toward the drum 45 and pivotally connected as at 73' to the upper end of the band. With this arrangement, when the shaft 62 is rotated in a clockwise direction, as viewed in Figure 5, the brake band 55 is loosened but when the shaft 62 is moved in a counter-clockwise direction, as viewed in said figure, the brake band 55 is tightened.

For the purpose of normally holding the lever 60 in neutral position with both brake bands released, a rod 75 is pivotally connected as at 76 to a crank arm 77 fixed to the control shaft 62, the rod 75 sliding through a lug 77' formed integral with the housing 5. On the opposite sides of the lug 77', springs 78 and 79 are fitted on the rod 75. The inner ends of the springs 78 and 79 abut the lug 77' while the outer ends thereof engage adjustable abutments or nuts 81 and 82 threaded on the rod 75. The springs 78 and 79 are so compressed as to yieldably hold the control shaft 62 and consequently the control lever 60 in neutral position with both brake bands 35 and 55 released.

A setting head designated at S is provided and includes a column 90 having its base bolted as at 91 to the bed plate 2. In bearings 92, provided in the column 90, a vertical shaft 93 is provided and is geared to the set shaft 1 by means of a beveled pinion 94 fixed to the lower end of the vertical shaft 93 and meshing with a beveled gear wheel 95 keyed to the hub 25 of the planet pinion carrier 22 and consequently fixed to rotate with the set shaft 1. While the shaft 93 is termed a vertical shaft it is to be understood that both it and the column 90 may be and usually are slightly inclined from the vertical and the term vertical shaft is to be construed in this light in both the specification and in the claims. The vertical shaft 93 projects above the upper end of the column and has a main setting drum or ratchet drum 97 keyed thereto and rotatable therewith. A bifurcated clash arm 98 is provided and has bearings 99 mounted for free rotation about the axis of the shaft 93. One of the bearings 99 is rotatably mounted on the extension of the hub of the ratchet drum 97. Both bearings 99 are sectional to permit of assembly and disassembly. At their outer ends the arms 98 have integrally formed therewith an adjustable clash block 100 which, at the end of the setting movement, strikes the relatively fixed clash block 101 mounted on a vertical shaft 102 carried by a lateral extension 103 of the column 90. The adjustable clash block 100 and the bearing arms 98 on which it is formed may be swung around the ratchet drum 97 and engaged therewith at any selected point depending upon the thickness of the boards to be cut. This movement of the adjustable clash block 100 is facilitated by virtue of the provision of a handle 104 which also controls a shiftable pawl 105 fitted in an opening 100ª provided therefor in the adjustable clash block 100 and operated from the handle 104 by means of a crank arm 106 fixed to the axis 107 whereby the handle 104 is pivoted to the clash block 100 and pivotally connected as at 108 to the pawl block 105. A parallel crank arm 109 is pivoted as at 110 to the clash block 100 and is also pivoted as at 111 to the lower end of the pawl 105. Thus, when the handle 104 is rocked about its pivot 107 it moves the pawl 105 toward or away from the ratchet drum 97. The pawl 105 has teeth designed to interfit with the teeth of the ratchet drum to lock the clash block thereto at any point around the ratchet drum.

To facilitate setting of the clash arm 98 and clash block 100, especially when cutting a number of boards of the same thickness, an adjustable abutment designated generally at 112 is provided for the clash block 100 and is integrally formed with and extends laterally from a rotatable index plate 113.

As shown in Figure 3, the index plate 113 is rotatably mounted on the body and hub extension 120 of a fixed ratchet plate 114 having a central bearing loosely receiving a reduced extension 115 formed at the upper end of the vertical shaft 93. The ratchet plate 114 has a lateral mounting arm 116 formed adjacent its outer end with an opening fitted over and secured to the mounting shaft 102. A nut 119 is provided for holding the arm 116 on its shaft 102 and consequently on the shaft 93.

In a slot or guideway formed in the adjustable abutment 112, a sliding pawl or detent 121 is fitted and is urged toward and into engagement with the ratchet plate 114 by means of a compression coil spring 122 having one end abutting the detent 121 and having its other end abutting a plug or abutment 123 threadedly connected with and closing the outer end of the guideway which receives the detent 121. The positioning of the adjustable abutment and consequently of the index plate 113 and the manipulation of the sliding detent 121 is facilitated by virtue of the provision of a fixed handle 125 fastened as at 126 to the adjustable abutment and having a pivoted handle 127 cooperable therewith. The pivoted handle 127 is pivotally mounted as at 128 on the adjustable abutment and extends through a conically shaped cam slot 129 formed in the sliding detent 121. When the handles 125 and 127 are grasped and pulled together the detent 121 is retracted and disengaged from the ratchet plate 114 and with the handles so held they may be shifted angularly to properly position the adjustable abutment. The positioning of the adjustable abutment is readily and accurately gauged by virtue of the provision of a scale 130 on the index plate 113, a pointer 131 fixed to the upper end of the hub extension 120 of the fixed ratchet plate by screws 131' coacting with the scale of the index plate. The scale on the index plate consists of scale markings and numerals and indicates in inches and fractions of inches the thicknesses of the boards which may be cut. If the adjustable abutment is so set that the pointer registers with the one inch marking then by successively bringing the clash arm into engagement with the abutment in between each advance of the knees the knees will be advanced a sufficient amount during each setting operation to cut boards of one inch thickness. After the clash block 100 of the clash arm 98 is engaged with the adjustable abutment 112 and locked to the main ratchet drum at such point by its pawl 105, the operator shifts the lever 60 to throw in the planetary gear set P which imparts advancing or setting movement to the set shaft. This also rotates the vertical shaft 93 and the ratchet drum 97 and swings the clash arm 98 and its clash block 100 around until its strikes the fixed abutment or fixed clash block 101. This positively stops the advancing movement of the set shaft. The setter carefully watches this action and throws out the planetary gear set P upon engagement of the clash blocks, but if the setter is a little late no damage will result due to the provision of the slip clutch 12 and the slippage permitted by the brake band 35 under such circumstances.

In order to cushion the impact occurring when the clash block 100 strikes the relatively fixed clash block 101, cushioning means is organized with these clash blocks and the relatively fixed clash block 101 has a slight lateral swinging movement on the shaft 102.

Figure 1:
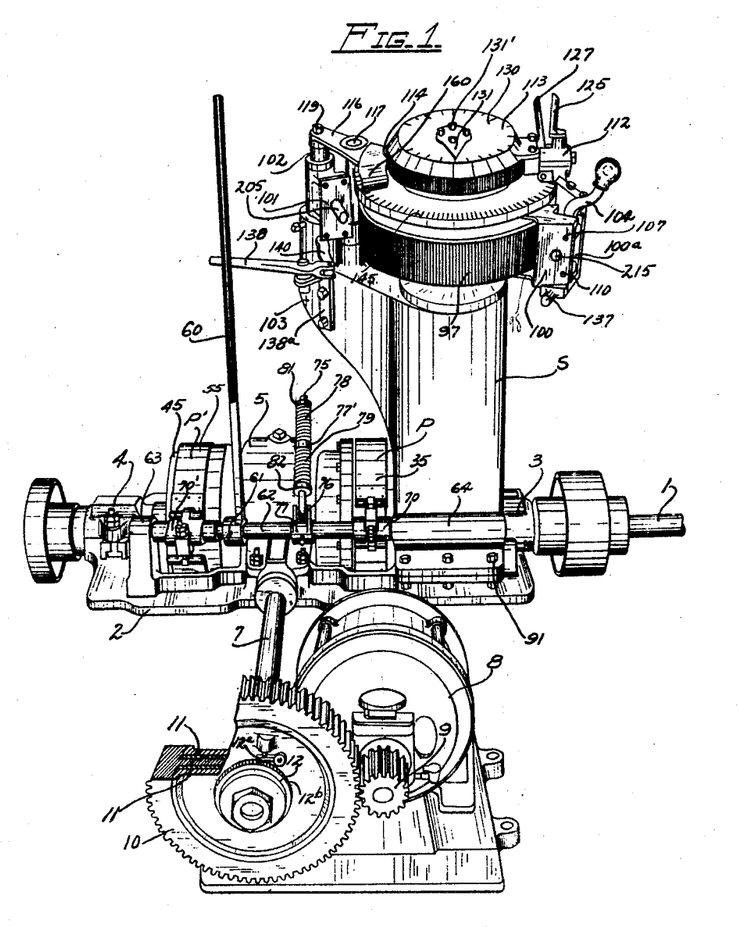
Figure 1 is a perspective view illustrating one form of setworks embodying the present invention.
Figure 2:
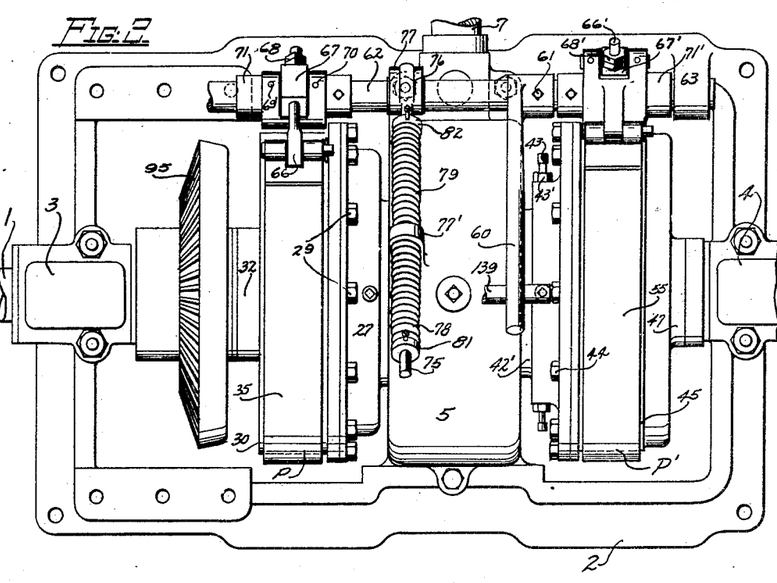
Figure 2 is a fragmentary plan view illustrating the means employed for advancing and receding the knees, the setting head and associated parts being omitted for the sake of clearness and simplicity in illustration.
Figures 12, 13, 14, 15:
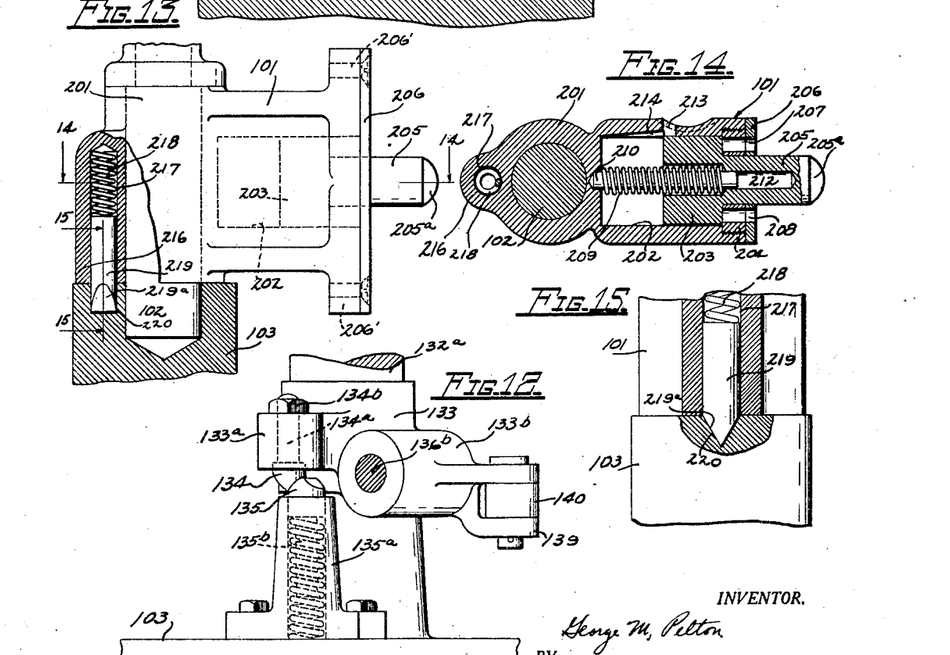
Figure 12 is a fragmentary detail view showing the releasable latching means for the locking pawl, parts being broken away and shown in section for the sake of illustration.
Figure 13 is a fragmentary view partly in section and partly in elevation showing the relatively fixed clash block and its spring pressed latching pin.
Figure 14 is a view in horizontal section taken on line 14—14 of Figure 13 and illustrating the shock absorber or cushioning means embodied in the relatively fixed clash block.
Figure 15 is a detail view in section on line 15—15 of Figure 13 further illustrating the releasable latching pin and its beveled seat or keeper.

Referring now to Figures 13, 14 and 15, it will be seen that the clash block 101 has a bearing portion 201 in which the shaft 102 is fitted. The body of the clash block 101 is formed with a cylinder 202 in which a piston 203 has a working fit. The piston 203 is prevented from moving out through the outer end of the cylinder 202 by means of an apertured end plate 204 threaded into a countersunk outer end of the cylinder. A projection or pin 205 is integral with the piston and projects exteriorly of the face of the clash block 101, this pin sliding through a central opening provided therefor in the end plate 204 and in the facing 206 of the clash block. The facing 206 is secured in position by countersunk screws 206′ and both it and the plate 204 have venting openings 207 and 208, respectively. The piston 203 is urged toward the outer end of its cylinder 202 (in which position its pin 205 projects beyond the face of the clash block) by means of a compression coil spring 209 having one end abutting the inner end wall of the cylinder 202 and having its other end abutting the piston 203. The spring 209 is mounted on a guide rod 210 fixed in the inner end of a cylinder and sliding in an axial guide opening 212 formed in the pin or projection 205. When the piston 203 is positioned at the outer end of its cylinder 202 it partially uncovers an escape port 213 which communicates with an escape groove 214 provided in the inner face of the cylinder 202 and gradually decreasing in cross sectional area rearwardly of the cylinder. The outer end of the projection 205 is rounded off as at 205$^a$ and is designed to engage a similarly formed seat or recess 215 provided in the clash block 100 (see Figure 1). This recess or seat 215 may have its face hardened or may be constituted of a hard steel insert secured in the face of the clash block 100. The bearing portion 201 has a rearward extension or tail 216 formed with a vertical guide opening 217 receiving a compression coil spring 218 and a latching pin 219, the spring 218 projecting the pin 219 down through the lower end of the opening 217 and into engagement with a seat 220 formed on the lateral extension 103 of the column. The lower end of the latching pin 219 is bevelled as at 219$^a$ and the seat 220 is similarly formed.

The latching pin 219, by virtue of its engagement with the seat 220 releasably holds the clash block 101 slightly angled with respect to its final stopping position and this positions the projection 205 of the cushioning means to engage the seat 215 of the clash block 100 when this clash block 100 swings toward the clash block 101 during a setting movement. When the projection 205 engages the seat 215 the piston 203 is displaced inwardly against the action of the spring 209 and against the resistance which the air in the cylinder 202 presents to the rearward movement of the piston 203 at this time. This resistance gradually increases as the escape of the air from the cylinder 202 becomes more and more restricted due to the covering of the port 213 and to the gradual covering of the groove 214. Just before the face of the clash block 100 strikes the facing 206 of the clash block 101 the piston 203 has completely covered the groove 214 and so the air confined between the piston 203 and the inner wall of the cylinder 202 is compressed as it can escape only with great difficulty and very slowly past the piston and the cylinder wall. During this final phase of a setting movement the clash block 100, by virtue of the engagement of its seat 215 with the projection 205 swings the clash block 101 to its final stopping position and this movement of the clash block 101 causes the latch pin 219 to ride part way up the sloping wall of its seat 220 against the action of the spring 218.

When the adjustable clash block 100 is repositioned for the next setting movement its seat 215 is disengaged from the projection 205 and the spring 209 moves the piston to the outer end of the cylinder to project the pin 205 to the full extent. At the same time the clash block 101 is freed and the spring 218 acts through the pin 219 and its seat 220 to throw the clash block 101 back to its normal angled position.

Figure 10:
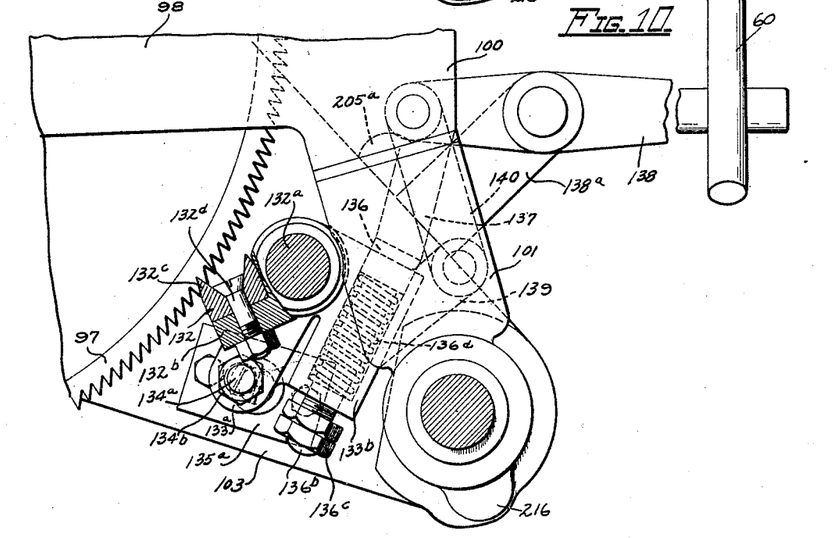
Fig. 10 is a view similar to Figure 9 but showing another position of the parts.
Figure 11:
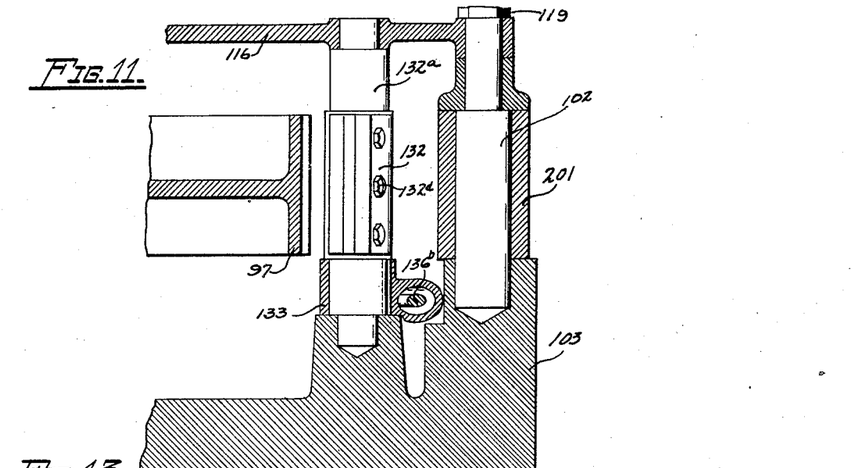
Figure 11 is a fragmentary detail view partly in vertical section on line 11—11 of Figure 6, the locking pawl being shown in elevation.

For the purpose of preventing rebound of the ratchet drum, means is provided which automatically engages the ratchet drum 97 to hold it against retrograde movement when the clash blocks 100 and 101 are engaged. This means for preventing retrograde movement of the main ratchet drum and consequently of the set shaft and knees consists of a pawl designated generally at 132 and having a shaft or axis 132$^a$ pivotally supported at its ends in the arm 116 and in the lateral extension of the column. The shaft 132$^a$ is formed with a lateral extension or seat 132$^b$ to which a reversible double tooth 132$^c$ is secured by screws and nuts 132$^d$. Only one prong of the double tooth 132$^c$ is used at a time but when one prong becomes worn the tooth may be reversed to bring the other prong into play. The active prong of the double tooth 132$^c$ is engageable with the teeth of the ratchet drum 97 as shown in Figure 10, and these parts are so shaped and so arranged that the pawl 132 when engaged with the drum 97 tends to lock the latter positively against retrograde movement but when the drum 97 is moved for setting it automatically kicks out the pawl 132. The tooth 132$^c$ has substantially the same extent as the ratchet drum 97 but its shaft 132$^a$ is considerably longer, as shown in Figure 11. On this shaft 132$^a$, below the tooth 132$^c$, a trip or control collar 133 is keyed or otherwise suitably fixed and has integrally formed therewith an apertured lug 133$^a$ and a tubular extension 133$^b$. The lug 133$^a$ carries a bevelled latch head 134, the head 134 having its shank 134$^a$ extending through the aperture of the lug and fastened in position by a nut 134$^b$. The latching head 134 is designed to snap to one side or the other of a sliding latching bolt 135 correspondingly bevelled and mounted in a tubular bracket 135$^a$ bolted to the lateral extension 103 of the column. A spring 135ᵇ projects the sliding latch 135 and maintains it in engagement with the latch head 134. This latching arrangement made up of the latching head 134 and the sliding latch 135 operates to releasably hold the pawl 132 engaged with or disengaged from the ratchet drum 97.

Figure 9:
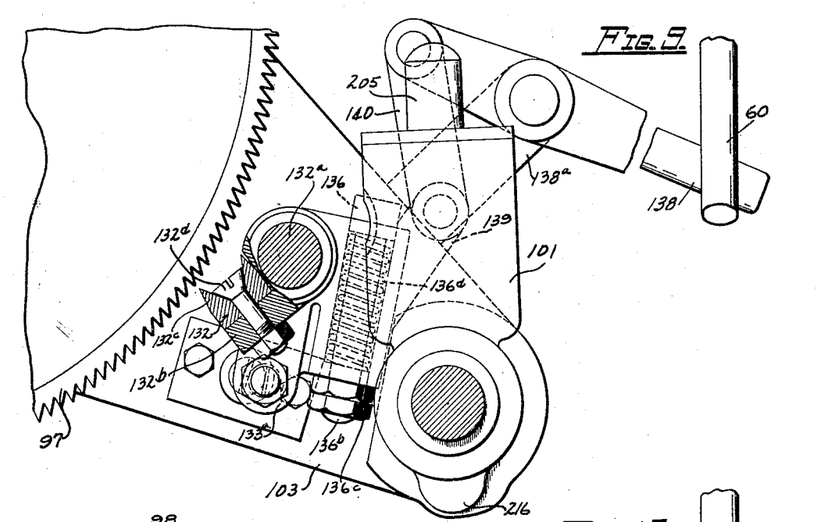
Figure 9 is a fragmentary view in transverse vertical section taken on line 9—9 of Figure 7, the locking pawl also being shown in section.

Means is provided for automatically shifting the pawl 132 to cause it to engage the ratchet drum 97 when the clash blocks 100 and 101 engage and this means includes a yieldable trip 136 slidably mounted in the tubular extension 133ᵇ of the collar 133. The trip 136 has a reduced extension or shank 136ᵇ which is slidably fitted in the tubular extension 133ᵇ and which has nuts 136ᶜ threaded on its rearward end engageable with the rearward end of the tubular extension 133ᵇ to limit the extent to which the head of the trip is projected forwardly of the tubular extension 133ᵇ under the influence of a compression coil spring 136ᵈ which encircles the shank or stem 136ᵇ of the trip and abuts the head of the trip at one end and a shoulder on the tubular extension 133ᵇ at its other end. When the pawl 132 is disengaged from the ratchet drum 97 the head 136ᵃ of the trip 136 lies in the path of a trip pin or lug 137 integral with or rigidly connected to the movable clash block 100. This trip pin or lug 137 is located on the lower portion of the clash block 100 and passes freely beneath the clash block 101 to engage the head 136ᵃ of the trip 136 and swing the trip 136, tubular extension 133ᵇ, and shaft 132ᵃ of the locking pawl as a unit thereby moving the active prong of the tooth 132ᶜ from the position shown in Figure 9 to the position shown in Figure 10, wherein it intermeshes or interfits with the teeth of the ratchet drum 97. This occurs just at the time the clash blocks engage and if there is any tendency to rebound it is positively prevented from doing so by the pawl. From a consideration of Figure 10 it will be apparent that if the setting head and its ratchet drum 97 tend to rebound the ratchet drum will tend to move in a counter-clockwise direction, as viewed in Figure 10, which tends to swing the pawl 132 more firmly into engagement with the ratchet drum and consequently prevents any rebound. When the ratchet drum partakes of a setting movement it moves in a clockwise direction as viewed in Figure 10, and consequently its setting motion tends to and does throw the pawl 132 out of engagement therewith.

For the purpose of automatically disengaging the pawl 132 from the ratchet drum 97 when the control lever 60 is swung to a position to cause receding movement, a release lever 138 is fulcrumed on a bracket 138ᵃ bolted to the extension 103 of the column and is connected by a link 140 with a lug 139 provided on the collar 133. The release lever 138 is located in the path of movement of the lever 60 and when the lever 60 is pushed rearwardly to cause the planetary gear set P′ to effect receding movement of the set shaft and knees this lever 60 engages the release lever 138 and automatically kicks out the pawl 132.

It is to be noted that when the operator disengages the clash blocks in order to effect a setting movement the swinging movement of the clash block 100 may occur only by swinging over the clash block 101 due to the interfitting of the extremity of the projection 205 and of the seat or recess 215. In this way, and due to the action of the latching pin 219 and its seat 220 previously described, the clash block 101 is repositioned automatically when the clash block 100 is manipulated for gauging a setting operation.

Figure 6:
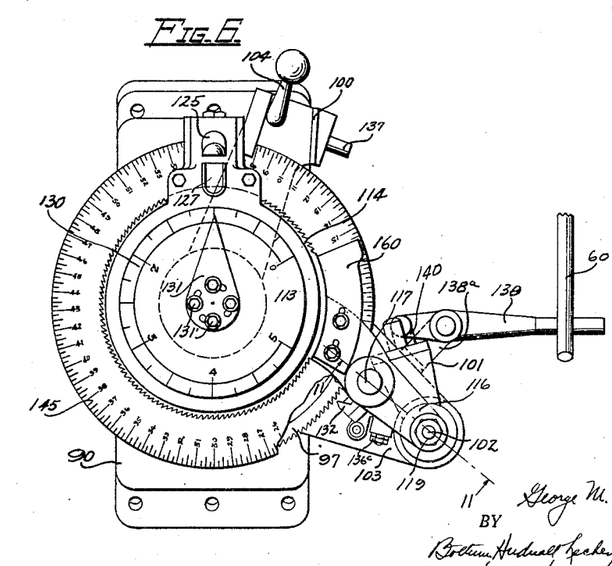
Figure 6 is a plan view of the setting head.

The setting head also includes means for indicating the distance of the knee face from the sawline, and this means comprises a horizontally disposed annular indicator plate 145 secured to the flange 146 of an internal gear 147, the internal gear 147 having a hub 148 rotatably fitted on the vertical shaft 93. The exterior of this hub 148 provides the mounting for the upper bearing arm 99 of the adjustable clash block 100. A driving eccentric 150 is machined on the shaft 93 and lies in the same plane as the internal gear 147. On this eccentric the hub of an intermediate gear wheel 151 is fitted, the gear wheel 151 having a number of its teeth always meshing with the teeth of the internal gear 147. Means is provided for constraining the gear 151 to move bodily without rotating. In other words, the gear 151 is held against rotation about its own axis but is free to partake of such bodily movement as will permit it to roll around the internal gear 147. This means consists of three eccentrics 152, each eccentric including a pin 153 rotatably fitted in a bearing provided therefor in the fixed ratchet plate 114 and an offset or eccentric pin 154 rotatably fitted in a bearing provided therefor in the gear wheel 151. The eccentrics 152 are spaced at equal angular intervals about the gear wheel 151 and they have the same throw as the eccentric 150. With this organization during the rotation of the shaft 93 its eccentric also rotates and due to the action of this eccentric 150 and to the action of the eccentrics 152 the gear wheel 151 is moved bodily in such manner as to roll around the internal gear 147 and thus impart to the gear 147 a greatly reduced rate of rotation from that of the shaft 93. This properly gears down the motion of the set shaft and moves the index or indicator 145 therefrom in such manner and degree that it indicates to the setter the distance of the knee from the sawline. As shown in Figure 6, the indicator or index plate 145 has scale markings and numerals designating inches and fractions thereof and these scale markings and numerals coact with a fixed indicator arm 160 secured to the mounting arm 116 of the fixed ratchet plate. With this mechanism the setting operations are greatly facilitated. The adjustable abutment 112 is first properly positioned by grasping the levers 127 and 125 to release the detent 121 and to adjust the index plate 113 until the proper scale marking thereon registers with the pointer 131. The handle 127 is then released whereby the adjustable abutment 112 is held in adjusted position. Now, as long as boards of the same thickness are to be cut the operator need not disturb the adjustment 112 and need only swing the clash arm 98 around to a position where it engages the adjustable abutment between each setting movement. Of course, when swinging the clash arm 98 to engage the adjustable abutment pawl 105 is released from the ratchet drum 97, but when the clash block 100 and the adjustable abutment 112 are engaged the setter latches the clash arm to the ratchet drum 97 by manipulating the handle 104 to engage the pawl block 105 with the ratchet drum. Then, by appropriately swinging the control lever 60, the planetary gear set P is set into operation to advance the knees until the clash blocks 100 and 101 engage in the manner previously described. Receding movement is effected by merely reversely moving the control lever 60, and disengaging the pawl block 105 from the ratchet drum 97. At any time a change in the thickness of the board being cut may be effected by appropriately adjusting the adjustable abutment 112. The indicating or gauging means which facilitates the proper position of the adjustable abutment is in the full view of the setter. This same advantage is also had in connection with the indicating means for displaying the distance of the knee face from the sawline.

The invention claimed is:

1. The combination of a set works comprising means for abruptly checking the advance of the knees, a set shaft, a pair of planetary gear sets operatively connected with the set shaft for reversely rotating the same, each planetary gear set including the usual elements, that is, a sun gear, planetary pinions, an internal orbit gear, one of the elements receiving the drive, another element applying the drive to the set shaft, means for braking the other elements, different elements being braked and applying the drive in the different gear sets whereby one planetary gear set rotates the set shaft forwardly when operated and the other rotates the set shaft reversely when operated and a relatively light power high speed motor for imparting rotation to both planetary gear sets.

2. The combination of a set works comprising means for abruptly checking the advance of the knees, a set shaft, a pair of planetary gear sets operatively connected with the set shaft for reversely rotating the same, each planetary gear set including a sun gear, a casing mounted for free rotation and a band cooperable with the casing for retarding or stopping its motion, means for driving the sun gears in the same directions, one gear set having a planet pinion carrier connected to the set shaft for driving the same, planet pinions rotatably mounted on the carrier and meshed with their sun gear, and an internal gear fixed to its casing and meshed with the planet pinions, the other gear set having planet pinions rotatably mounted on their casing and meshed with the sun gear, and an internal gear connected to the set shaft for driving the same and meshed with the planet pinions, and means cooperable with the bands for causing either gear set to operate the set shaft and a relatively light power high speed motor for imparting rotation to both planetary gear sets.

3. The combination of a set works comprising means for abruptly checking the advance of the knees, a set shaft, a driven gear loosely mounted on the set shaft, a high speed rotary motor for constantly turning the driven gear, and means for selectively imparting setting or receding movements to the set shaft and including a setting planetary gear set and a receding planetary gear set, each gear set having a sun gear fixed to rotate with the driven gear, a casing mounted for free rotation, and a band cooperable with the casing for retarding or stopping its motion, one planetary gear set having a planet pinion carrier fixed to the set shaft, planet pinions rotatably mounted on said carrier and meshing with their sun gear, and an internal gear fixed to its casing, the other gear set having planet pinions rotatably mounted on the casing and meshed with the sun gear and an internal gear fixed to the set shaft and meshed with the planet pinions, and a single control lever for applying either band while releasing the other.

4. The combination of a set works comprising means for abruptly checking the advance of the knees, a set shaft, a driven gear loosely mounted on the set shaft, a relatively light power high speed motor for constantly turning the driven gear, and means for selectively imparting setting or receding movements to the set shaft and including a setting planetary gear set and a receding planetary gear set, each gear set having a sun gear fixed to rotate with the driven gear, a casing mounted for free rotation, and a band cooperable with the casing for retarding or stopping its motion, one planetary gear set having a planet pinion carrier fixed to the set shaft, planet pinions rotatably mounted on said carrier and meshing with their sun gear, and an internal gear fixed to its casing, the other gear set having planet pinions rotatably mounted on the casing and meshed with the sun gear and an internal gear fixed to the set shaft and meshed with the planet pinions, and means cooperable with the bands for causing either set to operate the set shaft.

5. A sawmill setworks including a set shaft, and means for abruptly checking the advance of the knees, a set shaft, forward and reverse planetary gear sets connected to said shaft, a common power drive comprising a light power high speed motor connected to and actuating said planetary gear sets, each planetary gear set having a brake controlling its operation, and means for selectively operating said brakes to impart setting or receding motion to the set shaft.

6. A power drive for a set shaft of a sawmill setworks of the type including means for abruptly checking the advance of the knees comprising forward and reverse planetary gear sets, each planetary gear set including the usual elements, that is, a sun gear, planet pinions and an internal orbit gear, a unidirectional rotary motor for driving the sun gear of each set, one of the other elements of each gear set having driving connection with the set shaft, a third element of each planetary gear set being rotatably mounted with respect to the set shaft and controllable means for braking the third element of each gear set.

7. In a sawmill setworks having a set shaft and means for abruptly checking the advance of the knees, a setting planetary gear set including a sun gear rotatably mounted on the set shaft, a planetary pinion carrier fixed to the set shaft and having planet pinions meshed with the sun gear, an internal orbit gear rotatably mounted with respect to the set shaft and meshed with the planet pinions, a brake drum connected to the internal orbit gear and constrained to rotate therewith, a manually operable brake cooperable with said brake drum, and a receding planetary gear set including a sun gear rotatably mounted on the set shaft, a planet pinion carrier rotatably mounted on the set shaft and having planet pinions meshed with the sun gear, an internal orbit gear meshed with the planet pinions and connected to the set shaft to constrain the latter to rotate therewith and a brake drum fixed to the planet pinion carrier, a manually operable brake coacting with said last mentioned brake drum and a light power high speed drive for said sun gears.

8. In a sawmill setworks having a set shaft and means for abruptly checking the advance of the knees, forward and reverse planetary gear sets mounted on and connected to said set shaft, a high speed power drive connected to and actuating said planetary gear sets, a separate brake coacting with and controlling the operation of each gear set, interconnected operating mechanism for the brakes operable to apply either brake and simultaneously disengage the other and a single control lever for said operating mechanism.

9. A sawmill setworks including a set shaft and means for abruptly checking the advance of the knees, planetary gear mechanism connected to said set shaft for rotating the same, said planetary gear mechanism having manually operable brake means controlling its operation, and a relatively light power high speed motor drive connected to and actuating said planetary gear mechanism.

In witness whereof, I hereto affix my signature.

GEORGE M. PELTON.

CERTIFICATE OF CORRECTION.

Patent No. 1,786,776.             Granted December 30, 1930, to

GEORGE M. PELTON.

It is hereby certified that error appears in the printed specification of the above numbered patent requiring correction as follows: Page 8, line 8, claim 5, strike out the words and comma "a set shaft,"; and that the said Letters Patent should be read with this correction therein that the same may conform to the record of the case in the Patent Office.

Signed and sealed this 3rd day of February, A. D. 1931.

(Seal)

M. J. Moore,
Acting Commissioner of Patents.